US008717338B2

(12) United States Patent
Son et al.

(10) Patent No.: US 8,717,338 B2
(45) Date of Patent: May 6, 2014

(54) DISPLAY DRIVE CIRCUIT

(75) Inventors: Young-Suk Son, Daejeon-si (KR); Hyun-Min Song, Cheongju-si (KR); Hyun-Ja Cho, Cheongju-si (KR); Yong-Sung Ahn, Ansan-si (KR); Hyung-Seog Oh, Cheongju-si (KR); Dae-Keun Han, Daejeon-si (KR)

(73) Assignee: Silicon Works Co., Ltd., Daejeon-Si (KR)

( * ) Notice: Subject to any disclaimer, the term of this patent is extended or adjusted under 35 U.S.C. 154(b) by 553 days.

(21) Appl. No.: 13/063,539

(22) PCT Filed: Sep. 4, 2009

(86) PCT No.: PCT/KR2009/005030
§ 371 (c)(1), (2), (4) Date: Mar. 11, 2011

(87) PCT Pub. No.: WO2010/030097
PCT Pub. Date: Mar. 18, 2010

(65) Prior Publication Data
US 2011/0164006 A1 Jul. 7, 2011

(30) Foreign Application Priority Data
Sep. 11, 2008 (KR) ........................ 10-2008-0089516

(51) Int. Cl.
*G06F 3/038* (2013.01)

(52) U.S. Cl.
USPC ........................................... 345/204; 345/209

(58) Field of Classification Search
USPC ........................................... 345/204, 96, 209
See application file for complete search history.

(56) References Cited

U.S. PATENT DOCUMENTS

| | | | | |
|---|---|---|---|---|
| 6,373,459 | B1 | 4/2002 | Jeong | |
| 2007/0018923 | A1* | 1/2007 | Yokota | 345/89 |
| 2008/0170057 | A1* | 7/2008 | Park et al. | 345/211 |

FOREIGN PATENT DOCUMENTS

| | | |
|---|---|---|
| CN | 101231807 | 7/2008 |
| KR | 10-2003-0055892 A | 7/2003 |
| KR | 10-2007-0077759 A | 7/2007 |

(Continued)

OTHER PUBLICATIONS

International Search Report, Appln No. PCT/KR2009/005030, dated Apr. 20, 2010.

(Continued)

*Primary Examiner* — Alexander Eisen
*Assistant Examiner* — Robin Mishler
(74) *Attorney, Agent, or Firm* — Kile Park Reed & Houtteman PLLC

(57) ABSTRACT

A display driving circuit includes a buffer section, an N-dot switch circuit, a charge sharing switch circuit, and a sharing voltage level control switch circuit. The buffer section buffers a plurality of pixel driving signals outputted from a plurality of DACs. The N-dot switch circuit selects paths of the plurality of pixel driving signals outputted from the buffer section in response to a first path selecting signal or a second path selecting signal that is determined depending upon a dot inversion method, and switches the paths to a plurality of output terminals. The charge sharing switch circuit shares charges among the plurality of output terminals in response to a charge sharing control signal. The sharing voltage level control switch circuit controls charge sharing between the plurality of output terminals and a voltage level upon charge sharing, in response to a sharing voltage level control signal.

9 Claims, 9 Drawing Sheets

(56) References Cited

FOREIGN PATENT DOCUMENTS

| | | | |
|---|---|---|---|
| KR | 10-2008-0053600 | A | 6/2008 |
| KR | 10-2008-0067493 | A | 7/2008 |
| TW | 200847113 | | 12/2008 |

OTHER PUBLICATIONS

Written Opinion of the International Searching Authority, Appln No. PCT/KR2009/005030, dated Apr. 20, 2010.

* cited by examiner

FIG. 1

N frame

| | | | | |
|---|---|---|---|---|
| + | + | + | + | + |
| + | + | + | + | + |
| + | + | + | + | + |
| + | + | + | + | + |
| + | + | + | + | + |

(N+1) frame

| | | | | |
|---|---|---|---|---|
| − | − | − | − | − |
| − | − | − | − | − |
| − | − | − | − | − |
| − | − | − | − | − |
| − | − | − | − | − |

FIG. 2

| | | | | |
|---|---|---|---|---|
| + | − | + | − | + |
| + | − | + | − | + |
| + | − | + | − | + |
| + | − | + | − | + |
| + | − | + | − | + |

FIG. 3

1-Dot

| | | | | |
|---|---|---|---|---|
| + | − | + | − | + |
| − | + | − | + | − |
| + | − | + | − | + |
| − | + | − | + | − |
| + | − | + | − | + |

2-Dot

| | | | | |
|---|---|---|---|---|
| + | − | + | − | + |
| + | − | + | − | + |
| − | + | − | + | − |
| − | + | − | + | − |
| + | − | + | − | + |

DISPLAY DRIVE CIRCUIT

BACKGROUND OF THE INVENTION

1. Field of the Invention

The present invention relates to a display driving circuit, and more particularly, to a display driving circuit which can reduce power consumption.

2. Description of the Related Art

In general, a display driving IC adopts an alternate current driving scheme in order to prevent an image sticking phenomenon that can occur due to the fact that various ionic or polar substances present in a display adhere to electrodes. Also, a flicker phenomenon can occur due to the parasitic capacitance of TFTs (thin film transistors) disposed in a display panel. Thus, in order to control the flicker phenomenon, an inversion driving method has been proposed in the art.

The inversion driving method is generally divided into frame inversion, line inversion and dot inversion methods.

FIG. 1 is a view explaining a frame inversion method.

FIG. 2 is a view explaining a line inversion method.

FIG. 3 is a view explaining a dot inversion method.

Referring to FIG. 1, in the frame inversion method, inversion is implemented every time when one frame ($N^{th}$ frame) is changed to another frame ($(N+1)^{th}$ frame). In these drawings, + and − represent different polarities. Referring to FIG. 2, in the line inversion method, inversion is implemented by the unit of a line. The drawing shows inversion by the unit of a vertical line. Referring to FIG. 3, in the dot inversion method, inversion is implemented by the unit of pixel. The dot inversion method can be divided into a first method in which inversion is implemented by the unit of one-dot pixel and a second method in which inversion is implemented by the unit of two-dot pixel as a group.

While the frame inversion method shown in FIG. 1 is susceptible to the flicker phenomenon due to non-symmetry in the transmittance of a first polarity (+) and a second polarity (−) and is vulnerable to cross-talk due to interference between data, it provides advantages in that current consumption is small.

The line inversion method shown in FIG. 2 compensates for the luminance deviation between adjoining lines due to the voltages of the opposite polarities applied to the lines, using a spatial averaging technique, whereby the flicker phenomenon and the cross-talk between the lines can be reduced compared to the frame inversion method. However, in the line inversion method, since the frequency of alternate current increases compared to the frame inversion method, disadvantages are caused in that current consumption relatively increases.

The dot inversion method shown in FIG. 3 can reduce the flicker phenomenon by using the spatial averaging technique, whereas it has disadvantages in that current consumption is most large since the frequency of alternate current is greater than the two above-described methods. Nevertheless, because the dot inversion method provides advantages in that the flicker phenomenon is minimized, it is adopted most frequently. The following description will be given with regard to a display driving circuit which adopts the dot inversion method.

FIG. 4 is a view illustrating a portion of an output part of a display driving circuit.

Referring to FIG. 4, a conventional display driving circuit 400 includes a buffer section 410, an N-dot switch circuit 420, and a charge sharing switch circuit 430. The buffer section 410 has a plurality of buffers 411 through 416 which buffer M (M is an integer) number of pixel driving signals D1 through DM outputted from a plurality of DACs (digital-to-analog converters) (not shown). The N-dot switch circuit 420 selects the paths of the plurality of pixel driving signals D1 through DM outputted from the buffer section 410, depending upon the value of an N (N is an integer). The charge sharing switch circuit 430 shares charges between a plurality of output terminals output#1 through output#M for outputting the signals outputted from the N-dot switch circuit 420. The signals outputted from the plurality of output terminals output#1 through output#M drive respective pixels (not shown) which constitute a display panel.

When the case, in which the respective data D1 through DM outputted from the DACs are outputted through the corresponding output terminals output#1 through output#M via corresponding first path selecting switches S1, is called normal data transmission, the case, in which the respective data D1 through DM outputted from the DACs are outputted through the corresponding output terminals output#1 through output#M cross-connected to corresponding second path selecting switches S2, can be called inverted data transmission. This is because, in the phases of the data D1 through DM consecutively outputted from the DACs, for example, when the odd data D1, D3, . . . have a positive (+) phase, the even data D2, D4, . . . have a negative (−) phase.

FIG. 5 is an internal waveform diagram of the display driving circuit.

The waveform diagram shown in FIG. 5 has been taken on the basis of a vertical line in the two-dot inversion method shown in FIG. 3. Therefore, when viewing the waveform diagram in terms of time, in load signal Load, a first enabled signal is for the pixels included in a first line, and a second enabled signal is for the pixels includes in a second line. Since the waveform diagram has been taken on the basis of a vertical line, referring to FIG. 3, two data having an optional polarity are consecutively outputted, and then, two data having a polarity opposite to the optional polarity are consecutively outputted.

The way of inversion is determined by a POL signal POL and the load signal Load. In this regard, since one POL signal POL corresponds to two load signals Load, FIG. 5 corresponds to a waveform diagram for the two-dot inversion method. The POL signal POL and the load signal Load are signals generally used in a display driving circuit, and function to control a line register for storing data and a panel driving IC for generating a signal for driving a panel, using an analog voltage corresponding to the data outputted from the line register.

When the POL signal POL is in a logic high state, in the outputs 'Even Channel' supplied to optional even pixels included in an optional horizontal line, two data of a first polarity (+) are consecutively outputted in response to load signals Load, and in the outputs 'Odd Channel' supplied to odd pixels included in the same horizontal line, two data of a second polarity (−) are consecutively outputted in response to load signals Load. When the POL signal POL is in a logic low state, in the outputs 'Odd Channel' supplied to optional odd pixels, two data of the first polarity (+) are consecutively outputted in response to load signals Load, and in the outputs 'Even Channel' supplied to even pixels, two data of the second polarity (−) are consecutively outputted in response to load signals Load.

A first path selecting signal SW1 applied to the first path selecting switches S1 has the same phase as the POL signal POL, and a second path selecting signal SW2 applied to the second path selecting switches S2 has a phase opposite to that of the POL signal POL. In the case of the output signals 'Even Channel' supplied to optional even pixels, when the phase of the POL signal POL is logic high, the outputs of the plurality of buffers constituting the buffer section 410 are outputted as final outputs by the first path selecting switches S1 which are turned on in response to the first path selecting signal SW1.

In the conventional art, in order to reduce current consumption, a charge sharing control signal SW3 to be applied to charge sharing control switches S3 connecting adjoining column data output terminals is enabled so that adjoining column data outputs can share charges through a portion of the interval of the load signal Load. At this time, a voltage change does not occur from the first polarity (+) to the second polarity (−) or vice versa as a transition to a different polarity, but a voltage change occurs from a middle voltage level CSM as a middle point between the first polarity and the second polarity to the first polarity (+) or from the CSM to the second polarity (−), whereby an amount of current consumption can be reduced.

Nonetheless, in the charge sharing interval in which the charge sharing control signal SW3 is enabled, the transition from the first polarity (+) to the middle voltage level CSM and the transition from the second polarity (−) to the middle voltage level CSM require a substantial amount of current consumption, by which a drawback is caused. This is because voltage level differences between the first polarity (+) and the middle voltage level CSM and between the second polarity (−) and the middle voltage level CSM are still substantial.

SUMMARY OF THE INVENTION

Accordingly, the present invention has been made in an effort to solve the problems occurring in the related art, and an object of the present invention is to provide a display driving circuit which can minimize current consumption.

In order to achieve the above object, according to the present invention, there is provided a display driving circuit comprising a buffer section, an N-dot switch circuit, a charge sharing switch circuit, and a sharing voltage level control switch circuit. The buffer section buffers a plurality of pixel driving signals outputted from a plurality of DACs. The N-dot switch circuit selects paths of the plurality of pixel driving signals outputted from the buffer section in response to a first path selecting signal or a second path selecting signal that is determined depending upon a dot inversion method, and switches the paths to a plurality of output terminals. The charge sharing switch circuit shares charges among the plurality of output terminals in response to a charge sharing control signal. The sharing voltage level control switch circuit controls charge sharing between the plurality of output terminals and a voltage level upon charge sharing, in response to a sharing voltage level control signal.

BRIEF DESCRIPTION OF THE DRAWINGS

The above objects, and other features and advantages of the present invention will become more apparent after a reading of the following detailed description taken in conjunction with the drawings, in which:

FIG. 1 is a view explaining a frame inversion method;

FIG. 2 is a view explaining a line inversion method;

FIG. 3 is a view explaining a dot inversion method;

DETAILED DESCRIPTION OF PREFERRED EMBODIMENTS

Figure 4:
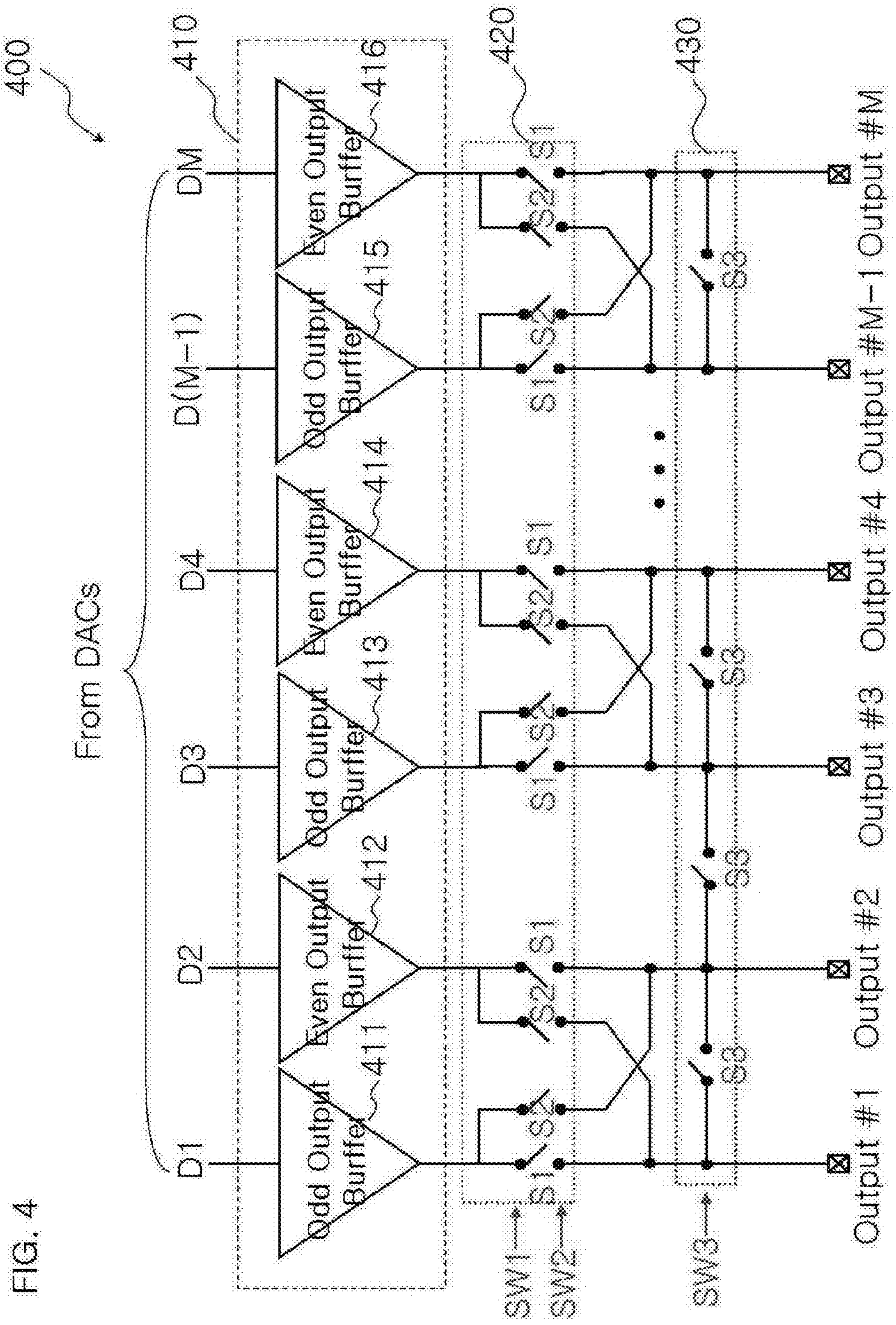
FIG. 4 is a view illustrating a portion of an output part of a display driving circuit.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 6:
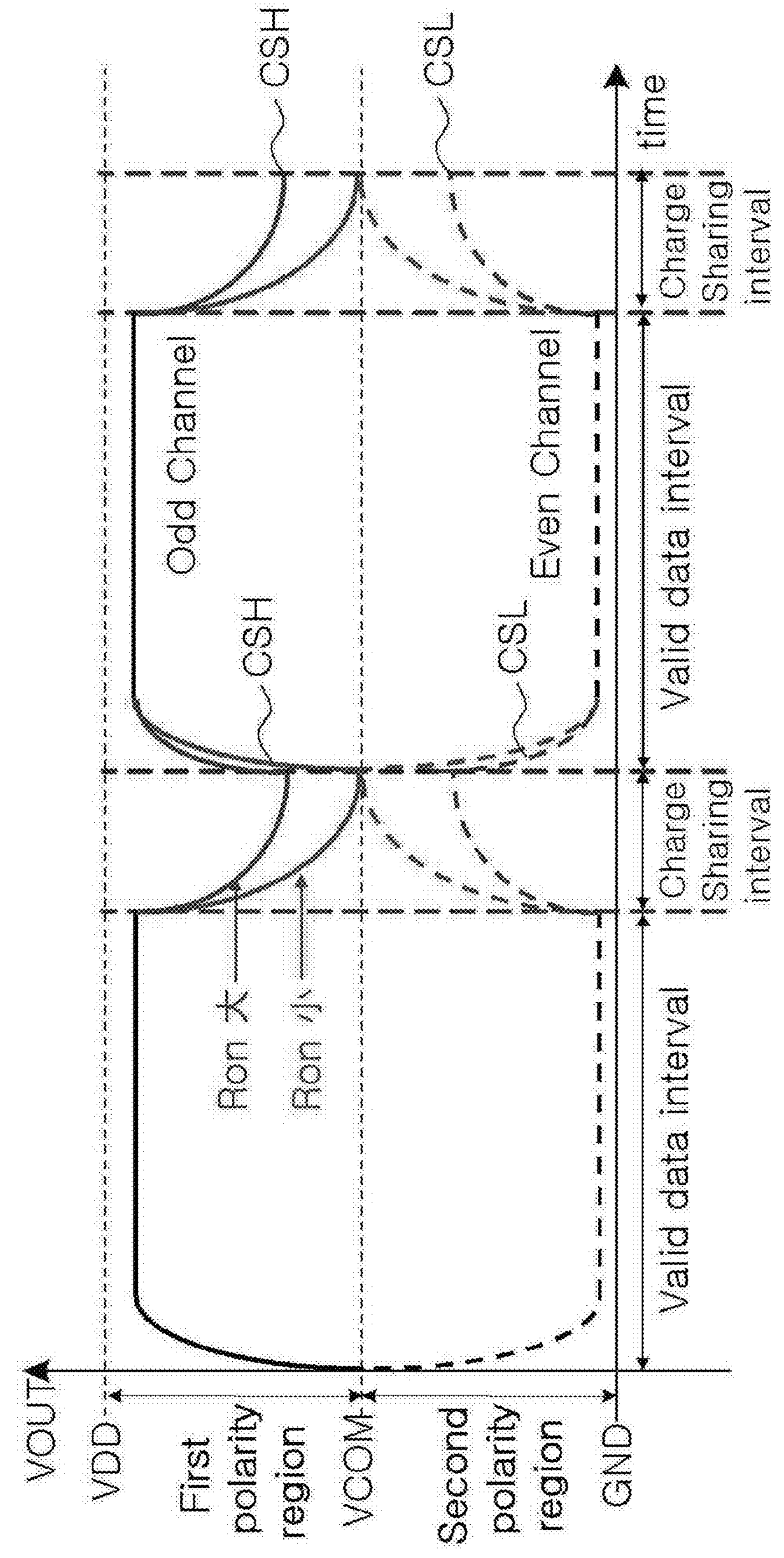
FIG. 6 is a graph showing the waveforms of output terminals depending upon the turn-on resistance value of a charge sharing switch circuit in a charge sharing interval.

FIG. 6 is a graph showing the waveforms of output terminals depending upon the turn-on resistance value of a charge sharing switch circuit in a charge sharing interval.

FIG. 6 depicts the waveforms of output signals in a valid data interval and a charge sharing interval, depending upon the turn-on resistance value Ron of the switches constituting the charge sharing switch circuit 430 shown in FIG. 4. Here, valid data means image data used for constituting a picture on a display panel, and the valid data interval means an interval during which the image data are transmitted to the display panel.

For the sake of convenience in explanation, the following description will be given with respect to the output signals 'Odd Channel' supplied to optional odd pixels shown by solid lines. The output signals 'Even Channel' supplied to even pixels can be easily inferred from the description for the output signals supplied to the odd pixels. The output signals mentioned in the following description indicate the signals outputted from the output terminals output#1 through output#M shown in FIG. 4.

Referring to FIG. 6, a first polarity region has a voltage range between a middle voltage level CSM and a first source voltage VDD, and a second polarity region has a voltage range between the middle voltage level CSM and a second source voltage GND. It is general that the second source voltage GND can be replaced with a ground voltage.

The charge sharing interval between two consecutive valid data intervals for outputting an optional voltage value that are included in the first polarity region (an upper part) is defined to improve the efficiency of the two valid data intervals. A data signal that is processed in the preceding valid data interval and has a preset voltage level in the first polarity region is pre-discharged to a voltage level near the middle voltage level CSM in the charge sharing interval. The data signal is then processed in the succeeding valid data interval to be changed from the pre-discharged signal that has the voltage level near the middle voltage level CSM to a signal that has the preset voltage level in the first polarity region.

The voltage level of the output terminals in the charge sharing interval is determined by the turn-on resistance value Ron of the switches constituting the charge sharing switch circuit 430. That is to say, in the case where the turn-on resistance value Ron of the switches is small (as shown by the red solid line), as in the conventional art, transition occurs from a voltage level near the first source voltage VDD to the middle voltage level CSM and then again to the voltage level near the first source voltage VDD. In the case where the turn-on resistance value Ron of the switches is relatively large (as shown by the blue solid line), transition occurs from a voltage level near the first source voltage VDD to a voltage level higher than the middle voltage level CSM and then again to the voltage level near the first source voltage VDD. Namely, it can be understood that, if the turn-on resistance value Ron of the switches is large, when transition occurs from the valid data interval to the charge sharing interval and then again to the valid data interval, the power consumed through the charge sharing interval can be reduced compared to the case where the turn-on resistance value Ron of the switches is small.

It is to be noted that, in the above description, the magnitudes of the turn-on resistance values mean that they are large and small relatively to each other and are not intended to be compared to a predetermined reference resistance value.

The present invention has been made based on these experimental results.

Figure 7:
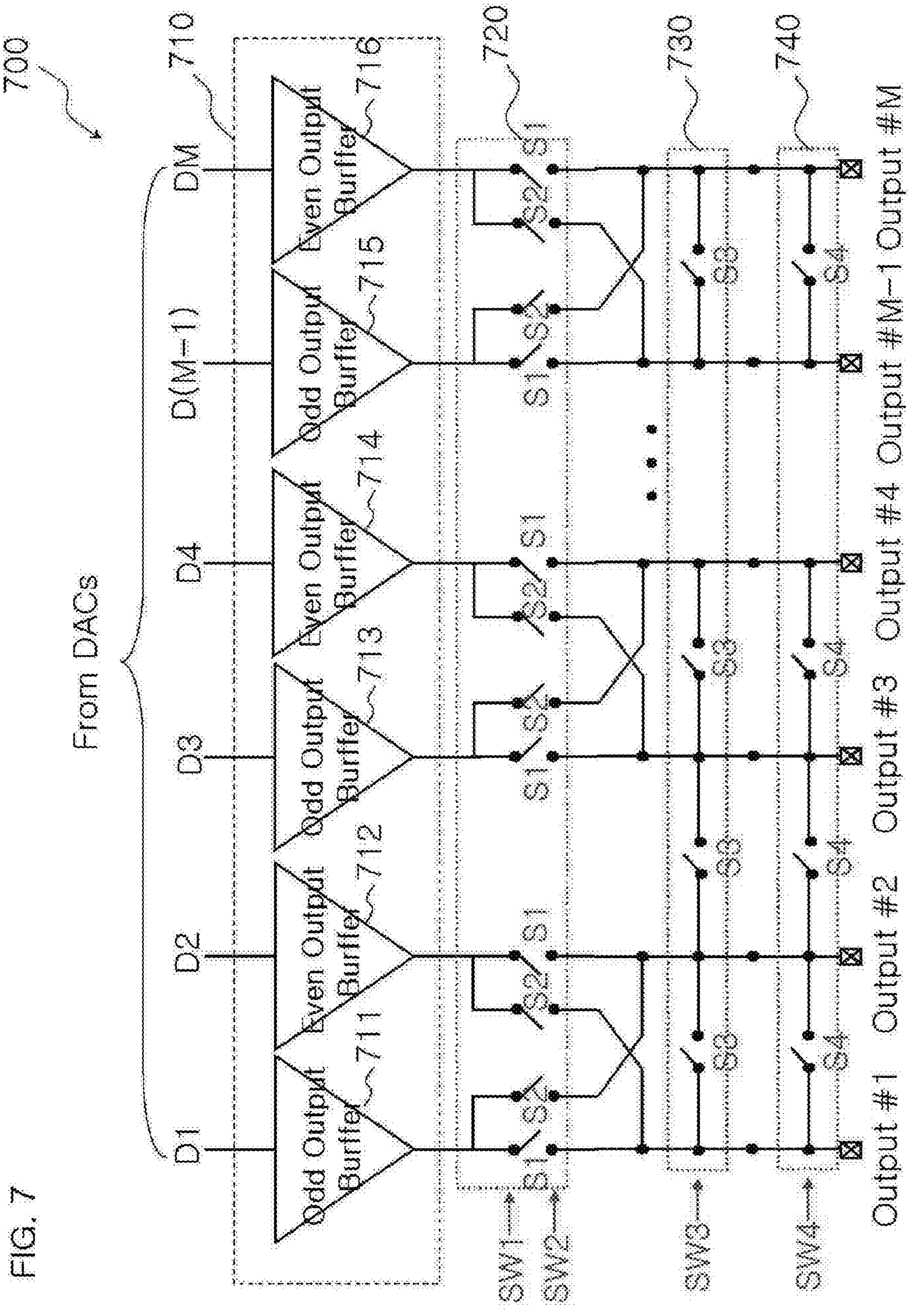
FIG. 7 is a view illustrating a display driving circuit in accordance with an embodiment of the present invention.

FIG. 7 is a view illustrating a display driving circuit in accordance with an embodiment of the present invention.

Referring to FIG. 7, a display driving circuit 700 includes a buffer section 710, an N-dot switch circuit 720, a charge sharing switch circuit 730, and a sharing voltage level control switch circuit 740.

The buffer section 710 has a plurality of buffers 711 through 716 which buffer M (M is an integer) number of pixel driving signals D1 through DM outputted from a plurality of DACs (not shown). While not shown in detail in FIG. 7, in the case of two-dot inversion, the polarity of the data outputted from the odd buffers 711, 713 and 715 and the polarity of the data outputted from the even buffers 712, 714 and 716 are opposite to each other. Also, the polarity of the data outputted from the buffers is determined depending upon an N selected in N (N is an integer)-dot inversion.

The N-dot switch circuit 720 selects the paths of the plurality of pixel driving signals D1 through DM outputted from the buffer section 710 depending upon the N. Here, it is assumed that the N is two.

The N-dot switch circuit 720 has first path selecting switches S1 which are used to directly connect the signals outputted from the corresponding buffers 711 through 716 to corresponding output terminals and second path selecting switches S2 which cross-connect the signals outputted from the adjoining buffers to the output terminals. The first path selecting switches S1 are turned on in response to a first path selecting signal SW1, and the second path selecting switches S2 are turned on in response to a second path selecting signal SW2. Since the N is two, the polarity of the data outputted from an optional buffer and the polarity of the data outputted from an adjoining buffer are opposite to each other. Accordingly, the data selected by the first path selecting switches S1 and the data selected by the second path selecting switches S2 have opposite polarities.

The charge sharing switch circuit 730 has a plurality of charge sharing switches S3 which are switched in response to a charge sharing control signal SW3, are respectively connected between neighboring output terminals among a plurality of output terminals output#1 through output#M, and share charges between the neighboring output terminals. In other words, if the charge sharing control signal SW3 is enabled, the plurality of output terminals output#1 through output#M are connected and share charges with one another.

The sharing voltage level control switch circuit 740 functions to control a sharing voltage level in a charge sharing interval, that is, when sharing charges to output data in the same polarity region through the charge sharing interval. To this end, the sharing voltage level control switch circuit 740 has a plurality of sharing voltage level control switches S4 which are switched in response to a sharing voltage level control signal SW4 and are respectively connected between adjoining N number of output terminals among the plurality of output terminals output#1 through output#M.

In order to describe the operation of the display driving circuit shown in FIG. 7, an internal waveform diagram will be explained below.

Figure 8:
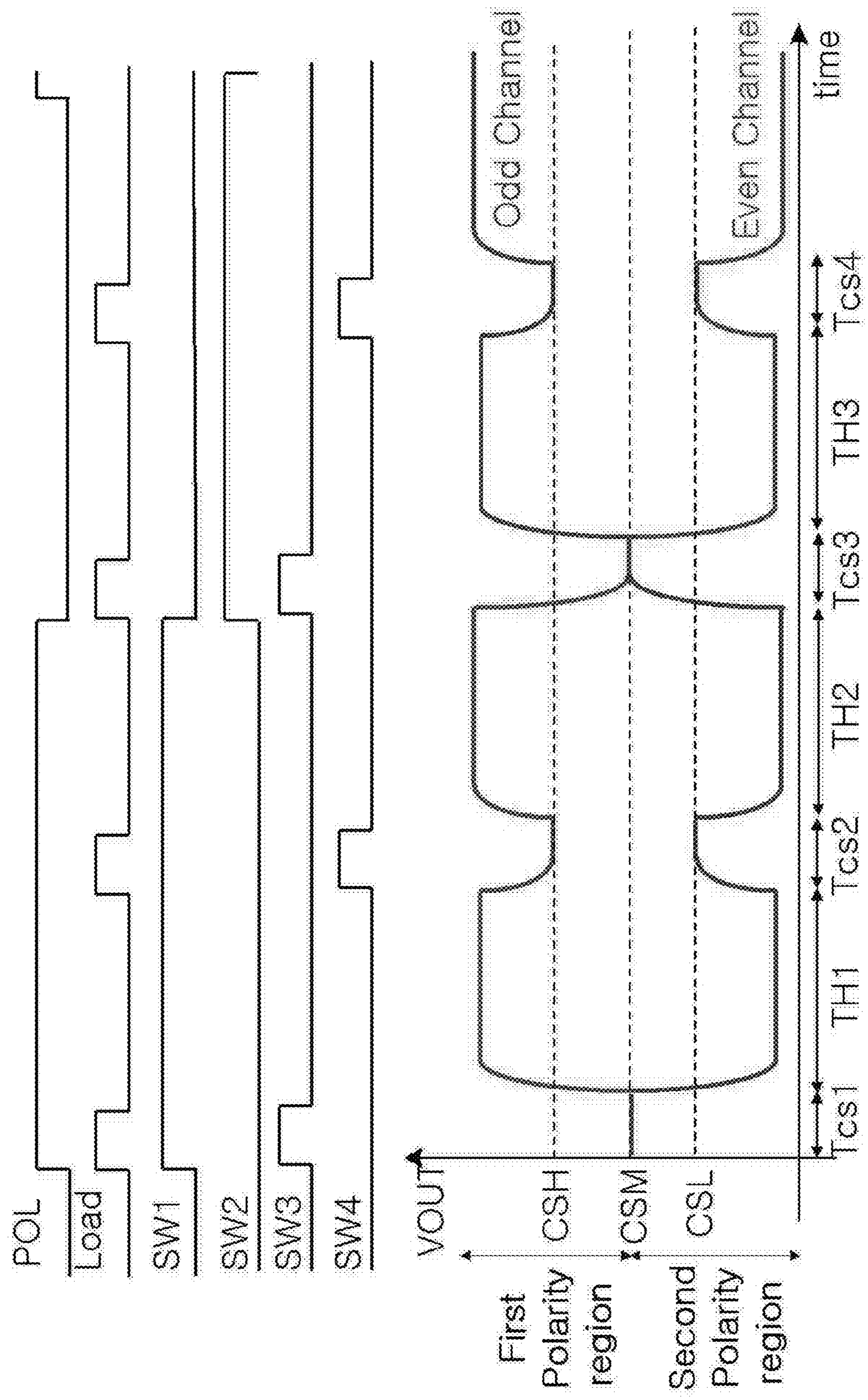
FIG. 8 is one exemplary waveform diagram of the display driving circuit according to the present invention shown in FIG. 7.

FIG. 8 is one exemplary waveform diagram of the display driving circuit according to the present invention shown in FIG. 7.

Figure 5:
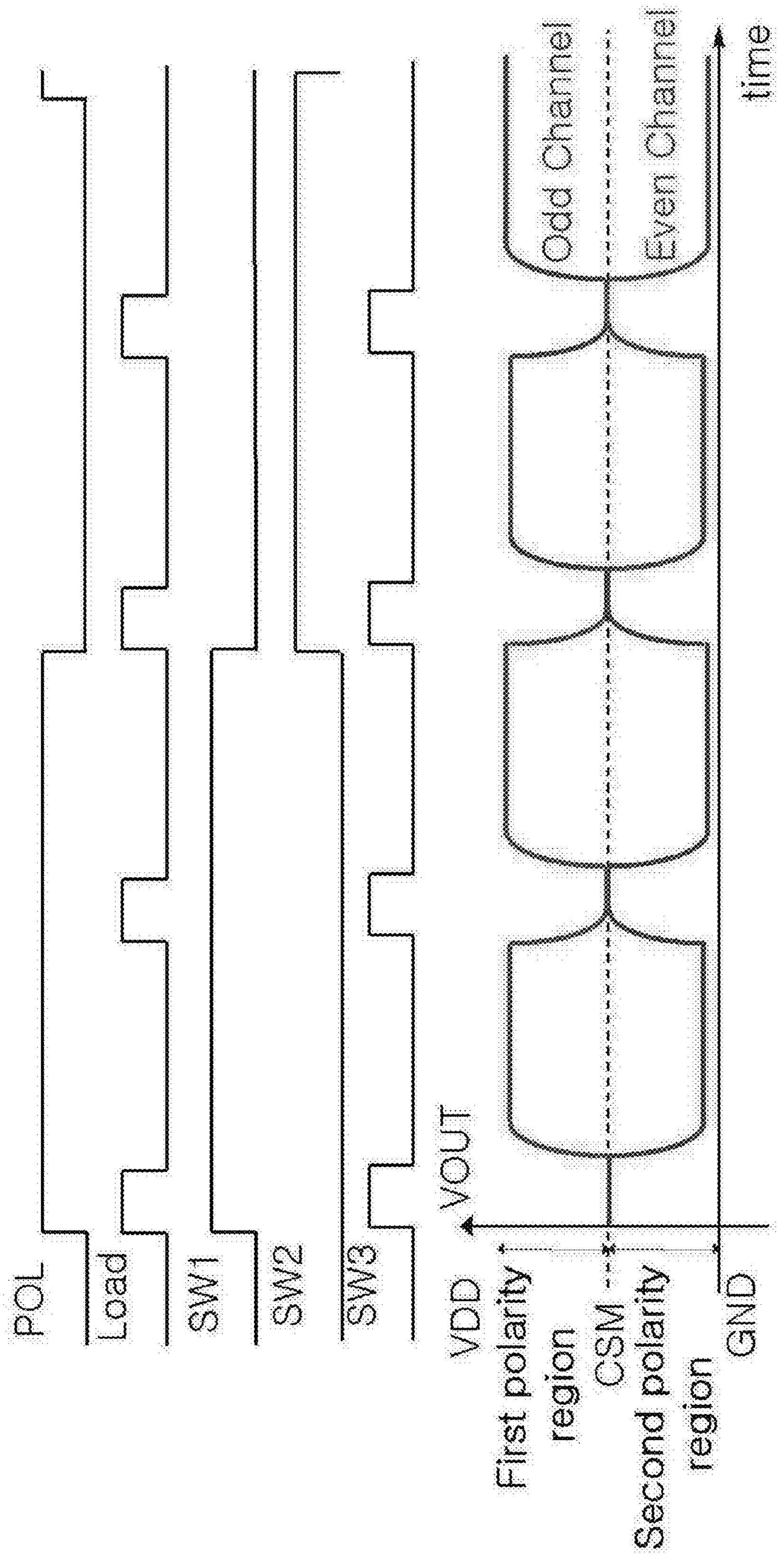
FIG. 5 is an internal waveform diagram of the display driving circuit.

The waveform diagram shown in FIG. 8 is the same as that shown in FIG. 5, except the waveforms of the sharing voltage level control signal SW4 and output terminals. Therefore, description will be given in detail with regard to the waveforms of the sharing voltage level control signal SW4 and output terminals that are shown lowermost in the drawing.

At the moment when a POL signal POL transits from a logic low state to a logic high state, the charge sharing switches S3 are turned on in response to the charge sharing control signal SW3. For an interval Tcs1 during which the charge sharing switches S3 are turned on, the output terminals have a voltage value corresponding to the middle voltage level CSM which distinguishes the first polarity region and the second polarity region.

Considering only the signals 'Even Channel' associated with the even output terminals for the sake of convenience in explanation, in the state in which the first path selecting switches S1 are turned on in response to the first path selecting signal SW1, for an interval TH1 after the charge sharing switches S3 are turned off in response to the charge sharing control signal SW3 and until the sharing voltage level control signal SW4 is enabled, data are transmitted to pixels via corresponding even output terminals.

For an interval Tcs2 during which the sharing voltage level control signal SW4 is enabled, charges are shared and the voltage level of the output terminals has the value of a first sharing voltage level CSH. The first sharing voltage level CSH is higher than the middle voltage level CSM.

For an interval TH2 after the sharing voltage level control signal SW4 is disabled and until the POL signal POL has a logic low value, the voltage level of the output terminals has a value corresponding to the value of the data.

Since it was aforementioned that the present invention would be described with regard to the two-dot inversion method, the cycle of the POL signal POL corresponds to two load signals Load. Hence, the POL signal POL is in the logic high state for an interval of two load signals Load and then in the logic low state for an interval of next two load signals Load. At the moment the POL signal POL transits from the logic high state to the logic low state, the polarity of the data outputted from the output terminals transits from the first polarity region to the second polarity region. Accordingly, after the POL signal POL transits from the logic high state to the logic low state, for an interval Tcs3 during which the charge sharing switches S3 are turned on, the output terminals have a voltage value corresponding to the middle voltage level CSM.

In the state in which the second path selecting switches S2 are turned on in response to the second path selecting signal SW2, for an interval TH3 after the charge sharing switches S3 are turned off and until the sharing voltage level control signal SW4 is enabled, data are transmitted to pixels via corresponding even output terminals. At this time, since the second path selecting switches S2 are turned on, the data outputted from the adjoining odd buffers 711, 713 and 715 are cross-selected and outputted.

For an interval Tcs4 during which the sharing voltage level control signal SW4 is enabled, the voltage level of the output terminals has a voltage value corresponding to a second sharing voltage level CSL. The second sharing voltage level CSL is lower than the middle voltage level CSM.

For an interval TH4 after the sharing voltage level control signal SW4 is disabled and until the POL signal POL has a logic high value, the voltage level of the output terminals has a value corresponding to the value of the data.

As shown in and mentioned above with reference to FIG. 6, the sharing voltage levels through the charge sharing intervals Tcs1 through Tcs4 vary depending upon the turn-on resistance value of the switches connecting two adjoining output terminals. In the charge sharing intervals Tcs2 and Tcs4 that belong to the same polarity regions, a sharing voltage level selectively has the first sharing voltage level CSH and the second sharing voltage level CSL so that current consumption through the charge sharing intervals Tcs2 and Tcs4 can be reduced to the minimum. Conversely, in the charge sharing intervals Tcs1 and Tcs3 during which transitions to different polarities occur, a sharing voltage level has the voltage value of the middle voltage level CSM in the same manner as in the conventional art.

The first sharing voltage level CSH is relatively higher than the voltage value of the middle voltage level CSM, and the second sharing voltage level CSL is relatively lower than the voltage value of the middle voltage level CSM. Referring to FIG. 8, charge sharing is implemented in response to the sharing voltage level control signal SW4 in the charge sharing intervals Tcs2 and Tcs4 that belong to the same polarity regions and in response to the charge sharing control signal SW3 in the charge sharing intervals Tcs1 and Tcs3 during which transitions to different polarities occur.

Here, the turn-on resistance value of the sharing voltage level control switches S4 operating in response to the sharing voltage level control signal SW4 is greater than the turn-on resistance value of the charge sharing switches S3 operating in response to the charge sharing control signal SW3.

Figure 9:
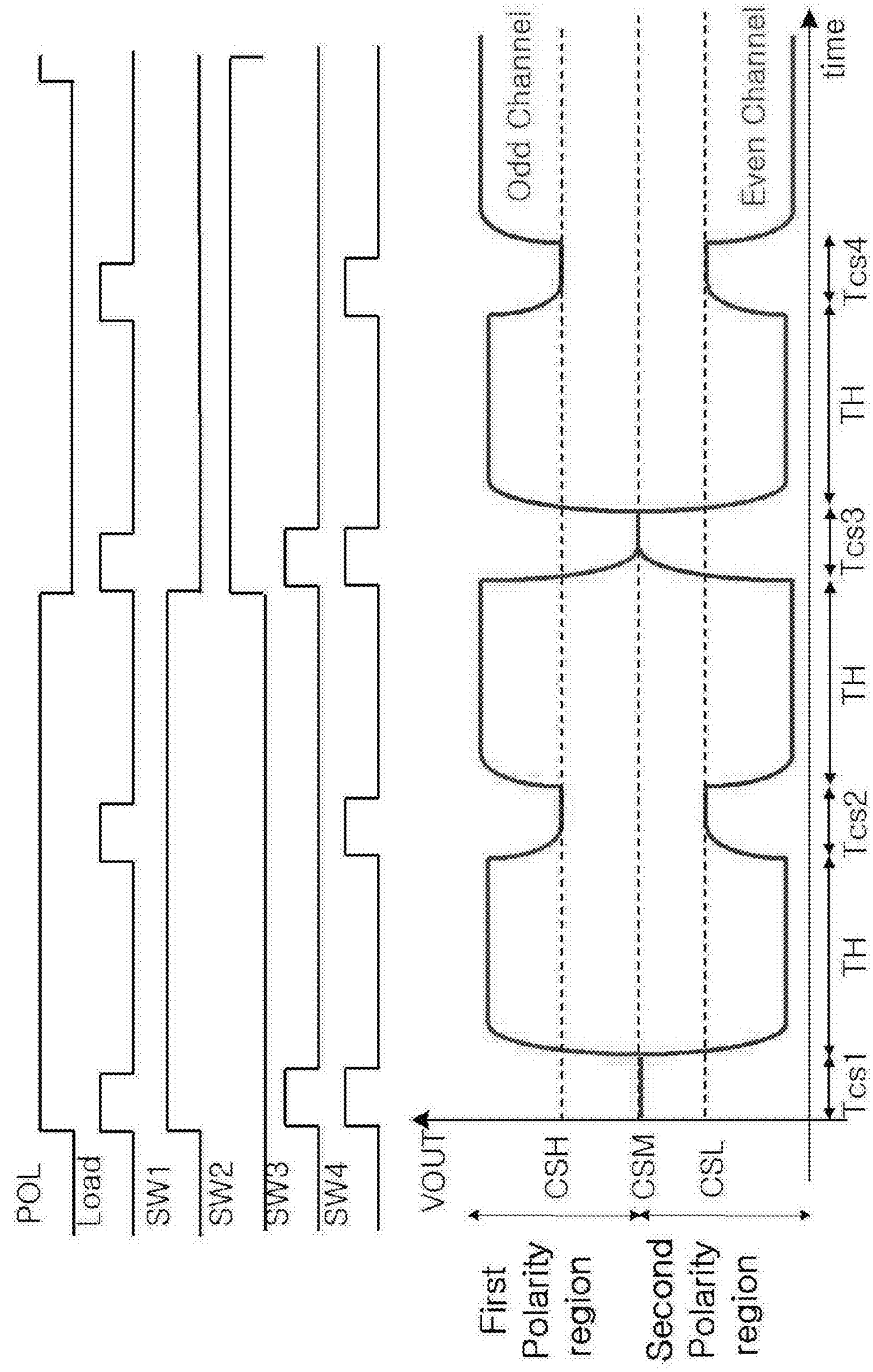
FIG. 9 is another exemplary waveform diagram of the display driving circuit according to the present invention shown in FIG. 7.

FIG. 9 is another exemplary waveform diagram of the display driving circuit according to the present invention shown in FIG. 7.

The waveform diagram of the display driving circuit shown in FIG. 9 is the same as the waveform diagram of the display driving circuit shown in FIG. 8 except that the cycle of the sharing voltage level control signal SW4 is shortened to ½ times.

Since the cycle of the sharing voltage level control signal SW4 is shortened to ½ times, in the charge sharing intervals Tcs1 and Tcs3 during which transitions to different polarities occur, the two switches S3 and S4 are simultaneously turned on. Because the two switches S3 and S4 are connected in parallel, the resistance value between terminals thereof decreases compared to the resistance values of the respective terminals, and accordingly, the turn-on resistance can be reduced in those intervals.

Hereafter, the operation waveforms of the conventional display driving circuit and the present display driving circuit will be compared to each other.

Figure 10:
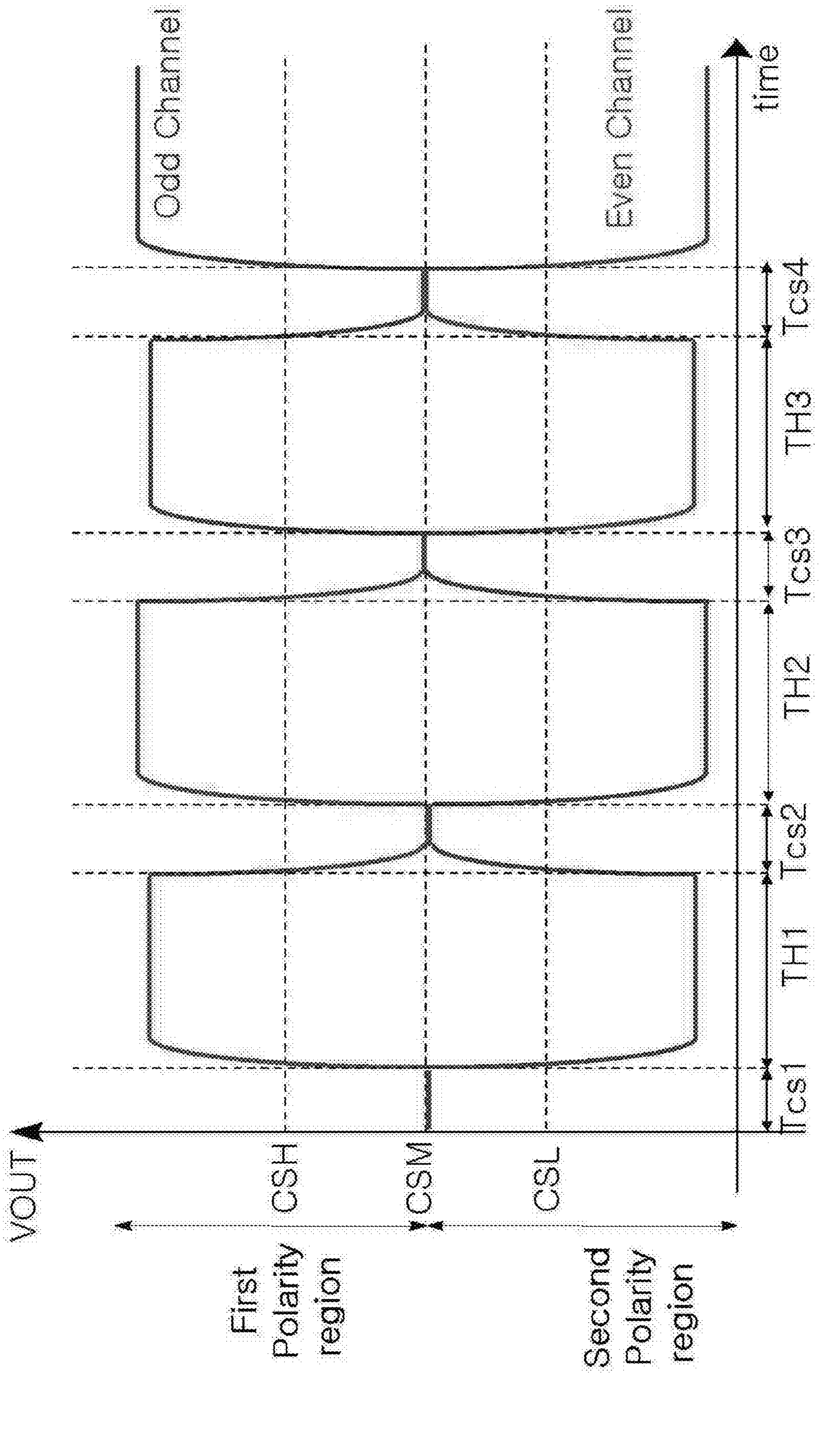
FIG. 10 is a graph showing the waveforms of the conventional display driving circuit.

FIG. 10 is a graph showing the waveforms of the conventional display driving circuit.

Figure 11:
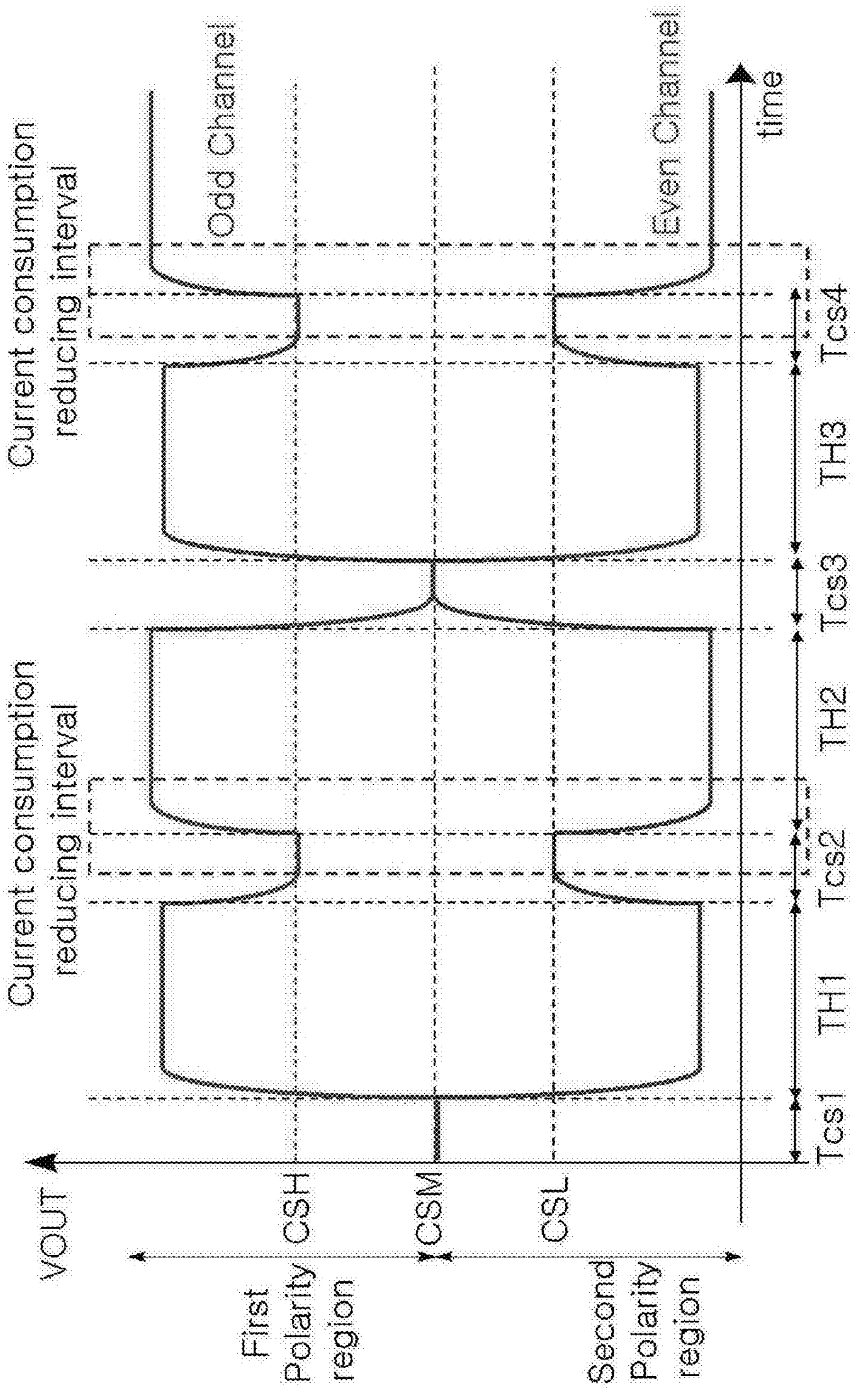
FIG. 11 is a graph showing the waveforms of the display driving circuit according to the present invention.

FIG. 11 is a graph showing the waveforms of the display driving circuit according to the present invention.

Referring to FIG. 10, in the conventional display driving circuit, not only in the charge sharing intervals Tcs1 and Tcs3 during which transitions to different polarities occur but also in the charge sharing intervals Tcs2 and Tcs4 that belong to the same polarity regions, the entirety of the sharing voltage levels corresponds to the middle voltage level CSM.

Conversely, referring to FIG. 11, in the case of the display driving circuit according to the present invention, while the sharing voltage level is the same as in the conventional art in the charge sharing intervals Tcs1 and Tcs3 during which transitions to different polarities occur, the sharing voltage level has the voltage level CSH or CSL relatively higher or lower than the middle voltage level CSM in the charge sharing intervals Tcs2 and Tcs4 that belong to the same polarity regions.

Therefore, the charge sharing intervals Tcs2 and Tcs4 that belong to the same polarity regions correspond to intervals during which current consumption can be relatively reduced.

As is apparent from the above description, the present invention provides advantages in that power consumption is reduced.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A display driving circuit comprising:

a buffer section configured to buffer a plurality of pixel driving signals outputted from a plurality of DACs;

an N-dot switch circuit configured to select paths of the plurality of pixel driving signals outputted from the buffer section in response to a first path selecting signal or a second path selecting signal that is determined depending upon a dot inversion method, and switch the paths to a plurality of output terminals;

a charge sharing switch circuit configured to share charges among the plurality of output terminals in response to a charge sharing control signal, wherein the charge sharing switch circuit comprises a plurality of charge sharing switches which are turned ON in response to the charge sharing control signal; and a sharing voltage level control switch circuit configured to control charge sharing between the plurality of output terminals and a voltage level upon charge sharing, in response to a sharing voltage level control signal, wherein the sharing voltage level control switch circuit comprises a plurality of sharing voltage level control switches which are turned ON in response to the sharing voltage level control signal, wherein, in a first charge sharing interval, the charge sharing switches are turned ON, and the voltage level of each of the output terminals is approximately a middle voltage level CSM which distinguishes a first polarity region from a second polarity region, and wherein, in a second charge sharing interval, the charge sharing switches are turned OFF, the sharing voltage level control switches are turned ON, the voltage level of each even output terminal in the output terminals is approximately an upper voltage level CSH which is higher than the middle voltage level CSM, and the voltage level of each odd output terminal in the output terminals is approximately a lower voltage level CSL which is lower than the middle voltage level CSM.

2. The display driving circuit according to claim 1, wherein the buffer section comprises a plurality of buffers which buffer the plurality of pixel driving signals, and respective data signals that are outputted from the plurality of buffers have one polarity of two different polarities;

wherein the N-dot switch circuit comprises a plurality of first path selecting switches which directly connect data signals outputted from the buffers included in the buffer section and having one optional polarity to corresponding output terminals in response to the first path selecting signal, and a plurality of second path selecting switches which cross-connect data signals outputted from the buffers included in the buffer section and having the other optional polarity to corresponding output terminals in response to the second path selecting signal; and wherein the charge sharing switches are respectively connected between adjoining output terminals among the plurality of output terminals.

3. The display driving circuit according to claim 2, wherein the sharing voltage level control switches are respectively connected between the adjoining output terminals among the plurality of output terminals.

4. The display driving circuit according to claim 1, wherein, the middle voltage level CSM is approximately in the middle between the voltage levels of first and second source voltages used in the display driving circuit, the upper voltage level CSH is higher than the middle voltage level CSM and is lower than the voltage level of the first source voltage, and the lower voltage level CSL is lower than the middle voltage level CSM and is higher than the voltage level of the second source voltage.

5. The display driving circuit according to claim 3, wherein the charge sharing control signal and the sharing voltage level control signal are exclusively enabled to each other.

6. The display driving circuit according to claim 5, wherein a turn-on resistance value of the plurality of charge sharing switches is less than a turn-on resistance value of the plurality of sharing voltage level control switches.

7. The display driving circuit according to claim 3, wherein the charge sharing control signal and the sharing voltage level control signal are commonly enabled during at least one time interval.

8. The display driving circuit according to claim 7, wherein the at least one time interval during which the charge sharing control signal and the sharing voltage level control signal are commonly enabled corresponds to a charge sharing interval that belongs to the same polarity region.

9. The display driving circuit according to claim 7, wherein a turn-on resistance value of the plurality of charge sharing switches is the same as a turn-on resistance value of the plurality of sharing voltage level control switches.

* * * * *